United States Patent
Fenster et al.

(10) Patent No.: US 7,555,154 B2
(45) Date of Patent: Jun. 30, 2009

(54) FULLY AUTOMATED SEGMENTATION OF GENETIC MICRO-ARRAY IMAGES

(75) Inventors: Aaron Fenster, London (CA); Yunqiu Wang, Waterloo (CA)

(73) Assignee: Biomedical Photometrics Inc., Waterloo, Ontario (CA)

( * ) Notice: Subject to any disclaimer, the term of this patent is extended or adjusted under 35 U.S.C. 154(b) by 670 days.

(21) Appl. No.: 11/074,787

(22) Filed: Mar. 9, 2005

(65) Prior Publication Data

US 2005/0201602 A1 Sep. 15, 2005

(51) Int. Cl.
*G06K 9/00* (2006.01)
*C07H 21/02* (2006.01)
(52) U.S. Cl. .................. 382/133; 382/274; 536/23.1
(58) Field of Classification Search .............. 382/106, 382/168, 128–134, 173, 178, 181, 203, 191–194, 382/209, 224, 232, 255–257, 274, 276, 291, 382/305, 318–321; 702/19; 536/23.1
See application file for complete search history.

(56) References Cited

U.S. PATENT DOCUMENTS

| | | | |
|---|---|---|---|
| 6,349,144 B1 * | 2/2002 | Shams | 382/129 |
| 6,577,956 B1 * | 6/2003 | Shams | 702/19 |
| 6,674,882 B1 * | 1/2004 | Shams | 382/129 |
| 6,990,221 B2 * | 1/2006 | Shams | 382/129 |
| 7,110,585 B2 * | 9/2006 | Cork et al. | 382/128 |
| 7,171,030 B2 * | 1/2007 | Foran et al. | 382/128 |
| 7,189,833 B2 * | 3/2007 | Cohen et al. | 536/23.1 |

* cited by examiner

*Primary Examiner*—Seyed Azarian
(74) *Attorney, Agent, or Firm*—Daryl W. Schnurr

(57) ABSTRACT

A method and system for automatically processing images from a micro-array uses an image processor that is controlled by software. The software controls the microprocessor to process images to ensure that the images meet a predetermined threshold. The microprocessor automatically calculates a size of spot image, a spacing between adjacent spot images, generates a first grid and adjusts the first grid to fit the spot images being processed.

15 Claims, 12 Drawing Sheets

(a)

(b)

309

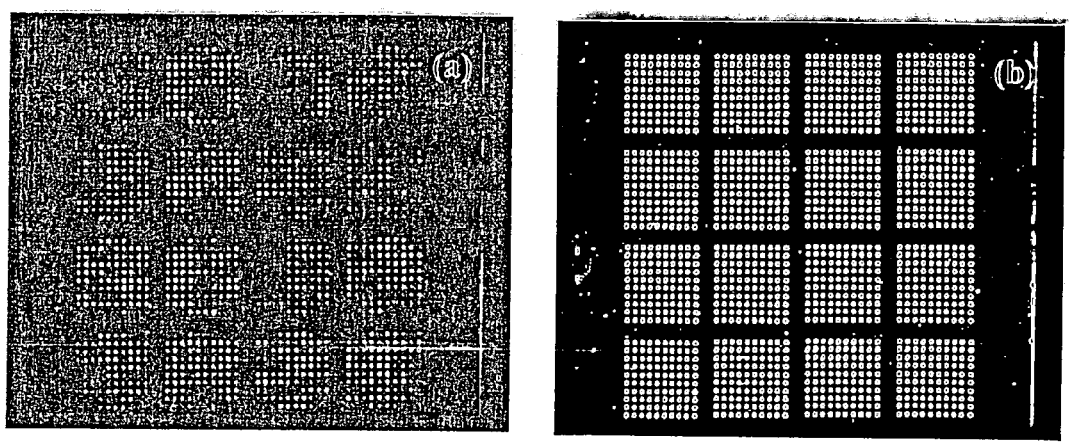
FIG 11. The spot identification results of TestCy5 image. (a) is original image, and (b) is the image with the identified spots by the algorithm.

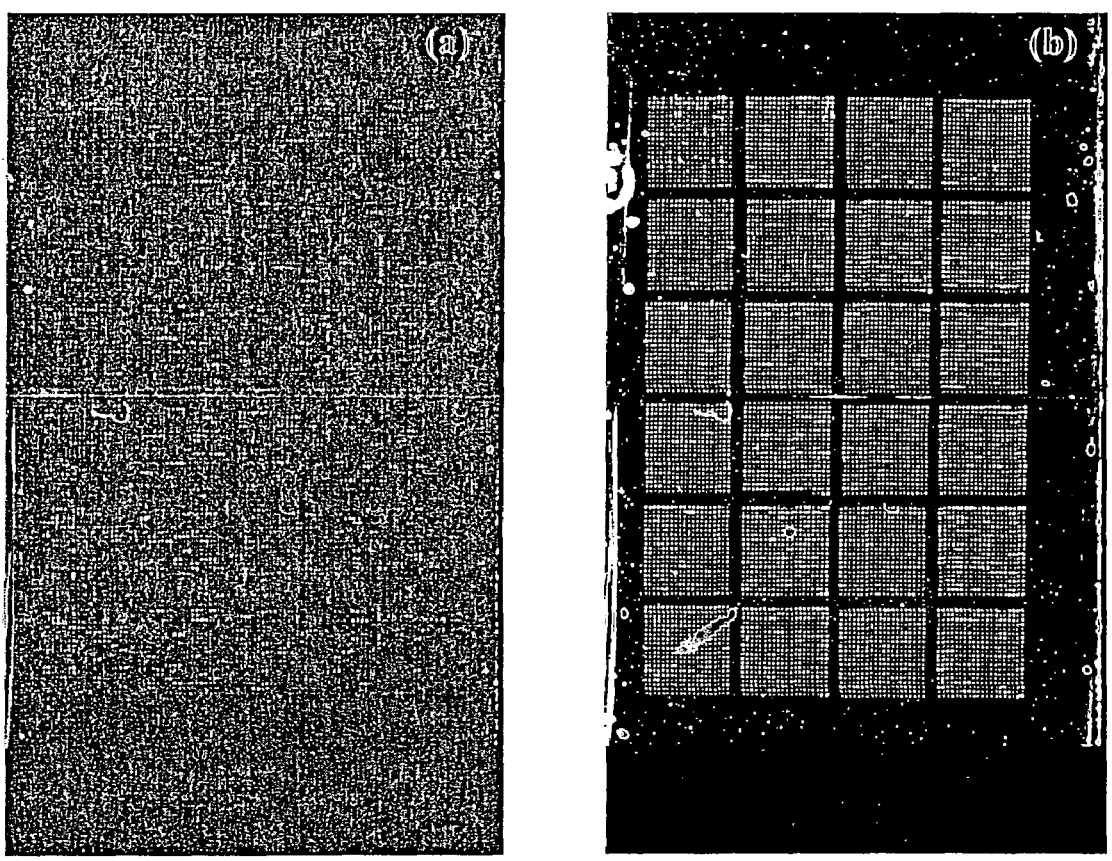
FIG. 12. The spot identification results of TestCy5 image. (a) is original image, and (b) is the image with the identified spots by the algorithm.

FULLY AUTOMATED SEGMENTATION OF GENETIC MICRO-ARRAY IMAGES

BACKGROUND OF THE INVENTION

1. Field of Invention

This invention relates to a method and system for automatically processing images from a micro-array using an image processor. More particularly, this invention relates to a DNA micro-array image segmentation algorithm with statistical analysis of spot centre overlay pattern, that automatically segments sub-grids and spot positions of genetic micro-array images and is used to further obtain the intensity of the spots using the overlay pattern of spots.

2. Description of the Prior Art

Micro-array image technology is a powerful tool for studying the expression of thousands of genes simultaneously. The micro-array images are obtained with different image quality making automated analysis of the micro-array spots very difficult. Some micro-array images are of a high image quality, i.e., the spots in the images are very clear without any noise in the image background. However, micro-array images with inferior image quality have some noise. Thus, the task of automated segmentation of the spots accurately and consistently must be immune to background noise as well as poor image contrast of the spots with respect to the background.

In Shams U.S. Pat. Nos. 6,349,144 and 6,577,956, there is described an automated DNA array image segmentation analysis method that is not completely automatic and has several limitations. In column 6, beginning at line 1, when a computer is used, the user selects an image file for processing, stores the image frame and displays on the display as a control image. The user is then said to select an image region and further to specify a number of columns and rows of arrayed image spots. Further, the imaging and software system described in the Shams Patent assumes that the pixel intensity corresponding to the DNA spots are greater than their surrounding background intensity values. Further, the method requires storing a frame of image information in a memory device and generating a grid in the memory device. FIG. 8 is said to illustrate an example of a general flow graph diagram for the program instructions of the computer system and the software system. The program instructions include at least two manual steps by a user in obtaining the four corners of an image area and indicating a satisfaction with grid placement.

With the large micro-arrays that are available and the large time input required for each manual step in any analysis or other processing of images, it is extremely important to provide a fully-automated method and system. Unfortunately, the systems and methods described in the Shams Patents are only partially automated and require steps that require a large time input and steps that can be eliminated entirely.

SUMMARY OF THE INVENTION

The goal of the algorithm is help automate the analysis of images produced by gene array chips. In developing this type of tool, the first task is to provide a software technique to automatically identify regions of the micro-array image, identify the spots in the image and obtain image intensity information to be analyzed and displayed by another algorithm.

In achieving the first task of automated image segmentation, the algorithm uses mathematical morphological operations and image measurement techniques. In achieving automated image segmentation, the algorithm proceeds along the steps listed below:

i. Re-sampling of the image to reduce its size;
ii. automated identification of the main grid;
iii. segmentation of the grid into sub-grid regions;
iv. in each sub-grid, analyze the number of spots and the spacing between the spots;
v. produce a sub-grid template by using the spot number and its spacing; and,
vi. matching the original image with the template structure and obtain the image intensity in every spot.

A method of automatically processing images from a micro-array using an image processor, the method comprising pre-processing images to ensure that the images meet a predetermined threshold, inputting images that meet the threshold to the image processor, the image processor automatically calculating a size of a spot image, automatically calculating a spacing between adjacent spot images, automatically generating a first grid, automatically adjusting the first grid to fit the spot images being processed and reporting an output.

A system for automatically processing images from a micro-array comprises a microprocessor controlled by software, said software controlling pre-processing of the images to ensure that the images meet a predetermined threshold. The images that meet the threshold are inputted to the microprocessor by the software. The microprocessor is then controlled by the software to automatically calculate a size of the spot image, automatically calculate a spacing between adjacent spot images, automatically generating a first grid, automatically adjust the first grid to fit the spot images being processed and to report an output.

BRIEF DESCRIPTION OF THE DRAWINGS

These and other features, aspects and advantages of the present invention will become better understood with regard to the following description, appended claims and accompanying drawings where:

FIG. 11 is the image presentation with an original high quality Cy5 image and the result of spots position identification using the fully-automated spot segmentation technique; and, FIG. 12 is the image presentation with an original very low-quality Cy3 image and the result of spot position identification using the fully-automated spot segmentation technique.

DETAILED DESCRIPTION OF A PREFERRED EMBODIMENT

1. Overview

This invention provides a fully-automated segmentation technique and its application software for automated segmentation of the spots in micro-array images. This invention can be used to automatically identify the grid overlays of micro-array images. The grid information can be used to initialize the positions of the spots, and then automatically calculate the intensity of every spot position within a certain area. This invention can be used effectively for low-noise and high noise micro-array images. This invention includes optimal image processing analysis, spot size analysis, noise reduction, and grid statistical analysis.

Figure 1:
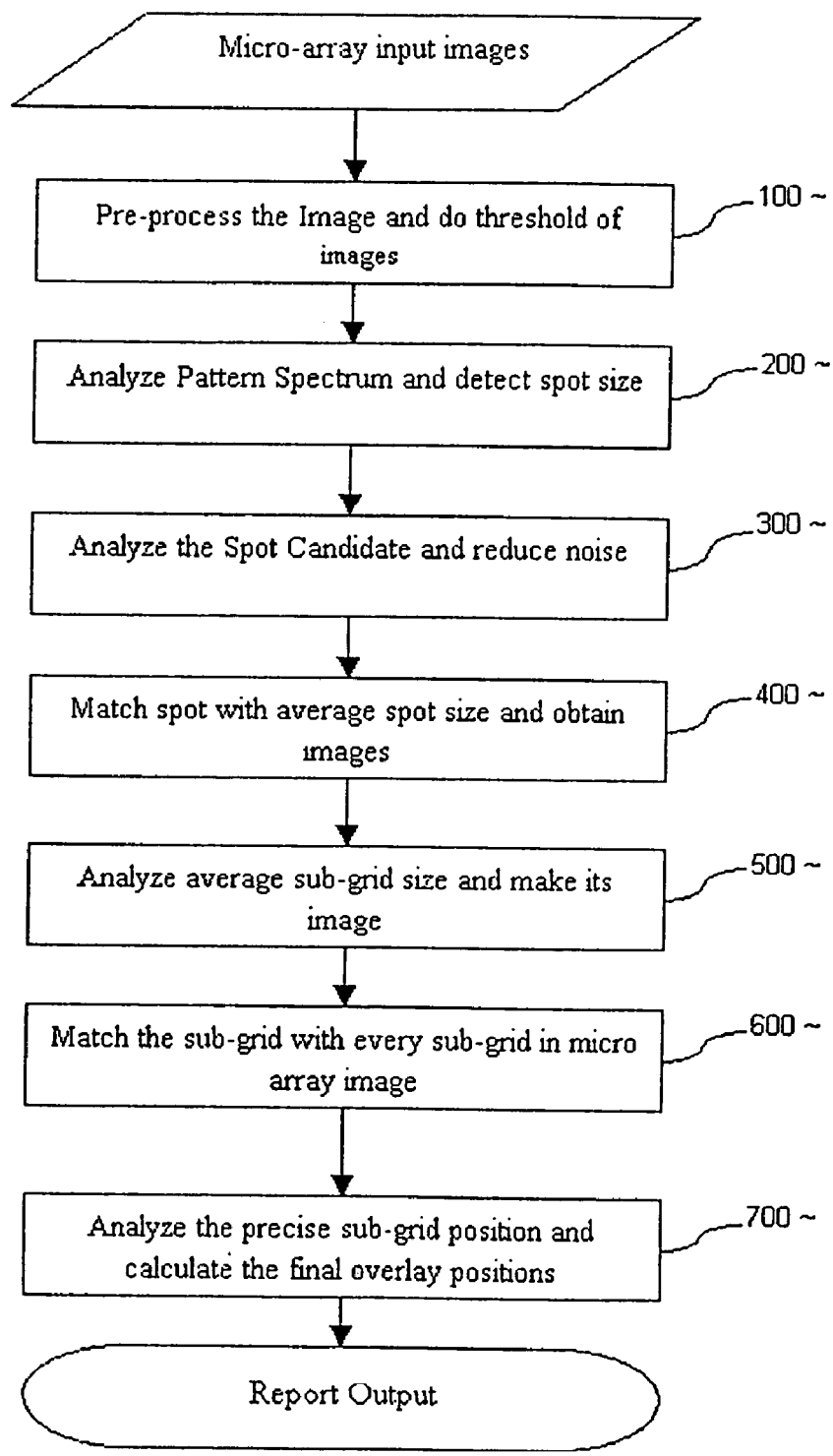
FIG. 1 illustrates a fully-automated spot segmentation technique with a series of embodiments.

FIG. 1 shows a high level operational flow chart of the present invention. The invention algorithm processes images (such as the one shown in FIG. 9(a) and FIG. 10(a)) by seven embodiments, which complete the image pre-processing analysis, pattern spectrum analysis, spot candidate analysis, spot matching, statistical analysis, sub-grid image matching, and precise comparison and matching.

2. Operations of Embodiments

Figure 2:
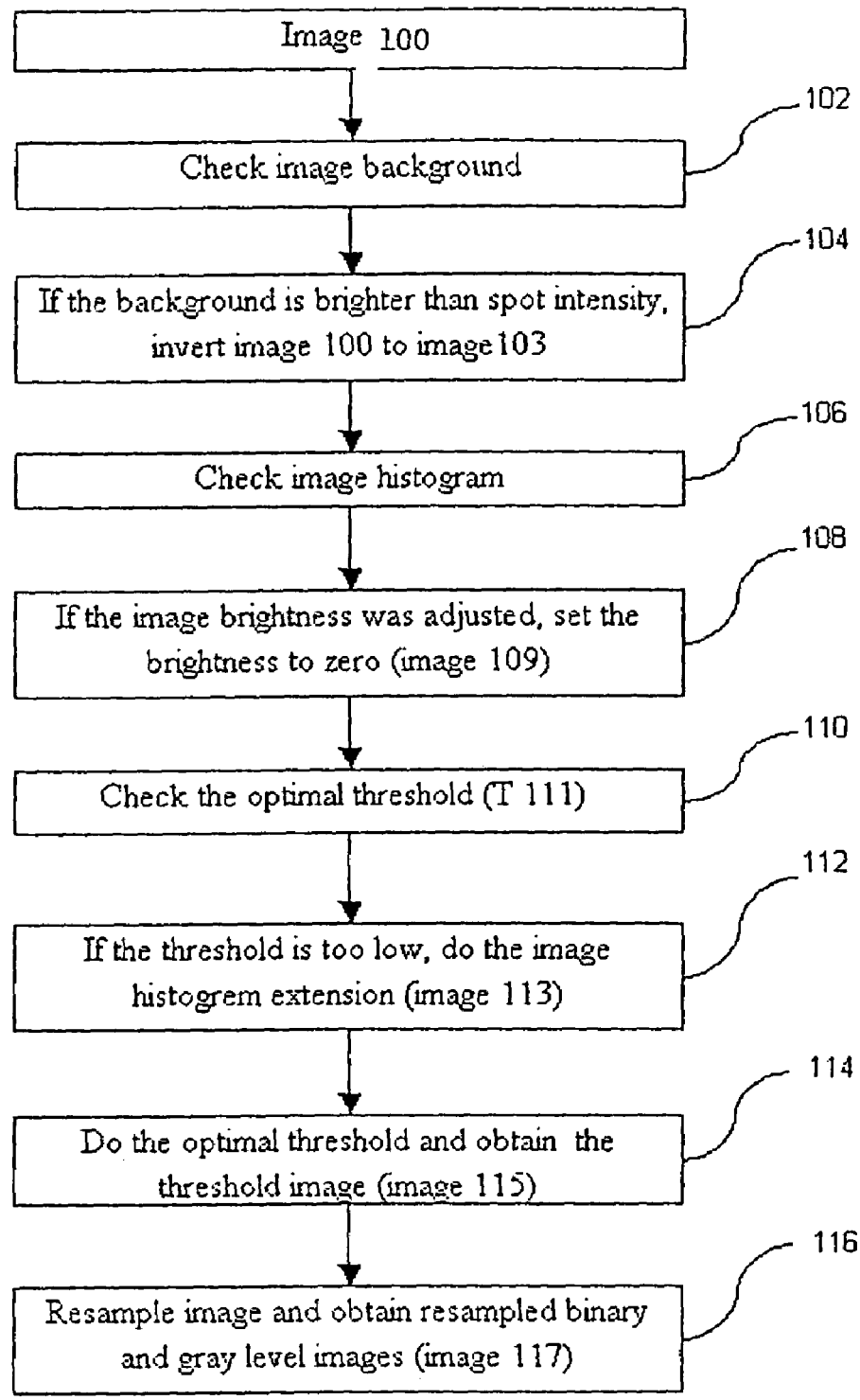
FIG. 2 illustrates the steps of an embodiment of the image pre-processing.

FIG. 2 shows the pre-processing embodiment. The original image is loaded as $I_0(x,y)$ (image 100). The background brightness of the image is checked at step 102. If the background is not darker than the brightness of spots (see FIG. 9(a) and FIG. 10(a) as examples), the image is inverted by Eq. 1: $I_{invt}(x,y)=I_{on}-I_0(x,y)$ (Eq. 1) at step 104, where $I_{invt}(x,y)$ (image 103) is the converted image, and $I_o$ has the value of 255, i.e., the highest grey levels of 8 bit images.

At step 106, the intensity histogram of the image is checked, and then the minimum intensity, $I_{MIN}$, of the image 103 is obtained. If $I_{MIN}$ is not equal to zero, the minimum intensity value of the image 109 is adjusted to zero at a step 108. The re-adjustment procedure is carried out using Eq. 2:

$$I_b(x,y)=I_{invt}(x,y)-I_{MIN} \quad (2)$$

Where $I_b(x,y)$ (109) is a result of step 108. At step 110, Otsu's method is used to analyze the intensity histogram and calculate the optimal threshold of the micro-array image. By using this step, the optimal threshold level T (threshold 111) and its binary image $I_t(x,y)$ (113) are obtained. If T is very low, a linear histogram transformation is used at step 112. The linear histogram transformation stretches the nonzero input intensity range:

$I_{invt}(x,y) \in [I_{iMIN}(x,y), I_{iMAX}(x,y)]$, to an output intensity range:

$I_{hist}(x,y) \in [I_{oMIN}, I_{oMAX}]$, to take advantage of the full dynamic range. The output range of image intensity ranges from minimum value of $I_{oMIN}(x,y)$ to the maximum value $I_{oMAX}(x,y)$, with typical values of 0 and 255 respectively for greyscale images. Each intensity value for the image is thus mapped to an output value $I_{hist}(x,y)$ 113 according to the following linear mapping function Eq. 3:

$$I_{hist}(x,y)=(I_{invt}(x,y)-I_{iMIN})/(I_{iMAX}-I_{iMIN}) \times I_{oMAX} \quad (3)$$

At step 114, the optimal threshold image 115 is obtained from image 113. At Step 116 the re-sampled image 117 is obtained by decreasing the size of the image. The width and height of the image are repeatedly divided by 2 to decrease the size until the image width is less than a predefined size. The ratio of re-sampling, r, is equal to $2^n$ (where n is the number of times the image has been divided).

Figure 3:
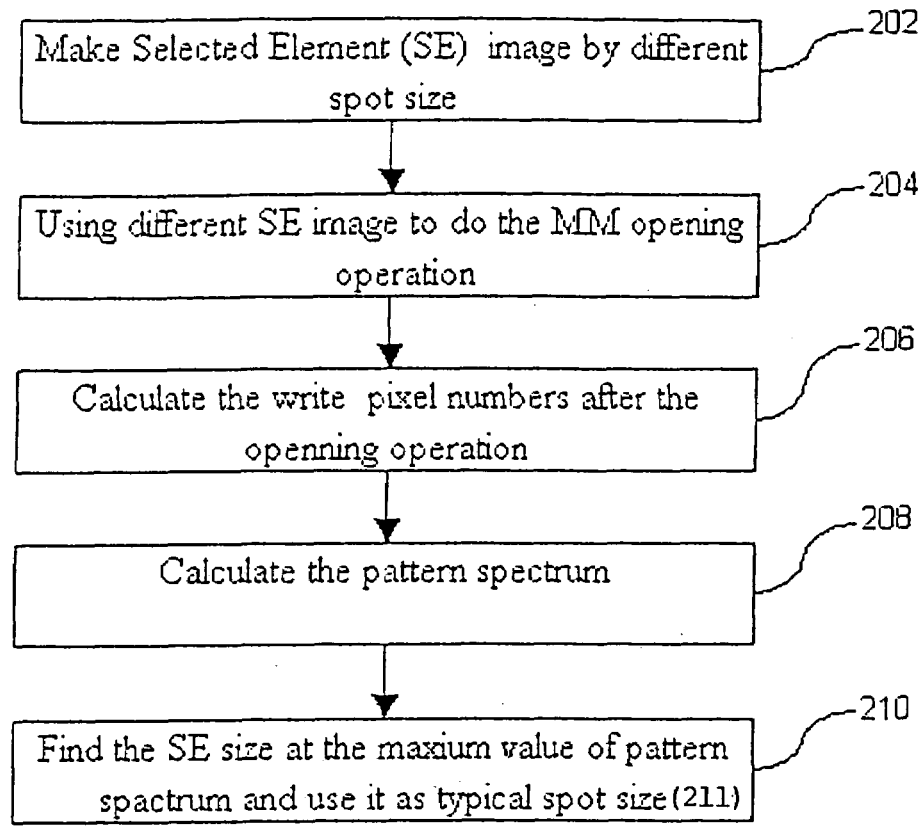
FIG. 3 illustrates the steps of an embodiment of the pattern spectrum analysis.

FIG. 3 shows the embodiment of pattern spectrum analysis. This procedure is used to obtain the typical spot size in the micro-array image. At step 202, a mathematical morphology element (well known image processing technique) is selected. At step 204, the selected morphological element (SE) is used to perform the opening operation and obtain a result. At Step 206, the total output (white) pixels of the resulting image is calculated to obtain the distribution of spot sizes. At Step 208, the pattern spectrum of distribution data is obtained and is used in the next step to calculate the approximate spot size. At step 210, the peak value of pattern spectrum curve is calculated as a typical spot size, SP, 211.

Figure 4:
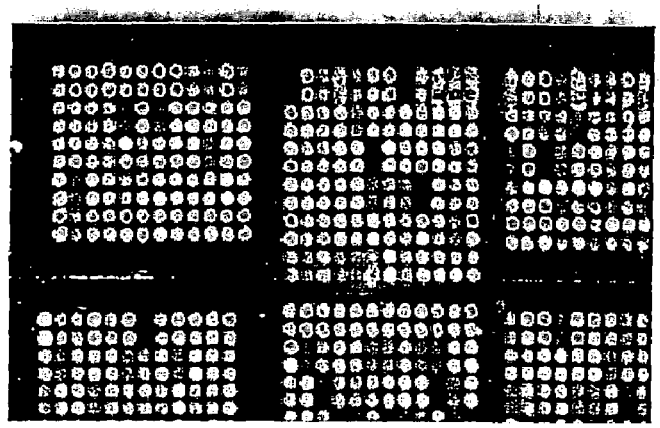
FIG. 4 illustrates a pattern spectrum curve of a micro-array image.
Figure 4:
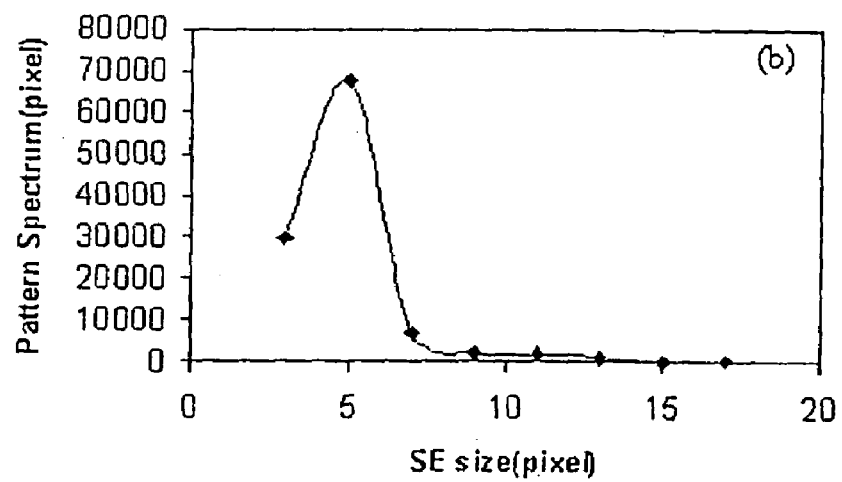

FIG. 4(b) shows the pattern spectrum curve of the micro-array image. The image in FIG. 4(a) is a part of a Cy3 image. The peak value of the pattern spectrum can be calculated from the pattern spectrum curve. In this figure, the peak value is approximately 5 pixels. This peak value is defined as the typical spot size of the image.

Figure 5:
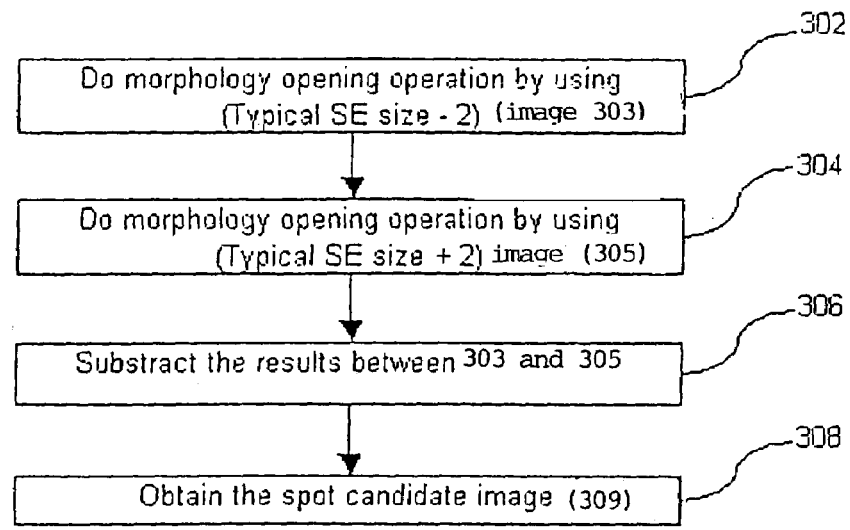
FIG. 5 illustrates the steps of an embodiment of spot candidate analysis.

FIG. 5 shows the embodiment of spot candidate matching procedure. The aim of this procedure is to reduce the noise in image 117. At step 302, an opening operation (mathematical morphology procedure) on image 117 is carried out by using a selected element size SE −2 (pixels). The result is image 303. At step 304, image 117 is calculated by an opening operation using a selected element size SE +2 (pixels). The result of this operation is image 305. At step 306, the image 305 is subtracted from image 303. This calculation removes the noise and maintains most of the information in the image. The result is image 309 in step 308.

Figure 6:
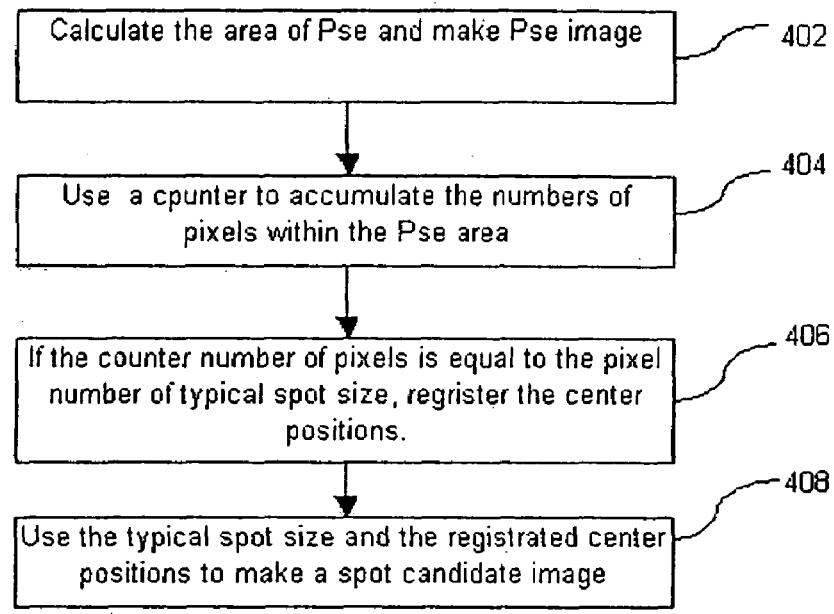
FIG. 6 illustrates the steps of an embodiment of spot matching with spot size.

FIG. 6 is the flow chart for the spot matching procedure. At step 402, a circle area (Pse) image 400 is made using a typical spot size of SP 211 obtained from the previous procedure. At step 404, a counter 403 is used to count the number of pixels (405) at every white pixel position of image 309. At step 406, if the number of pixels (405) is equal to 0.8 times the number of pixels in image 400, the white pixel positions are identified as possible spot centres. All possible spot centres are then matched, recorded as the output image 409.

Figures 7, 7A:
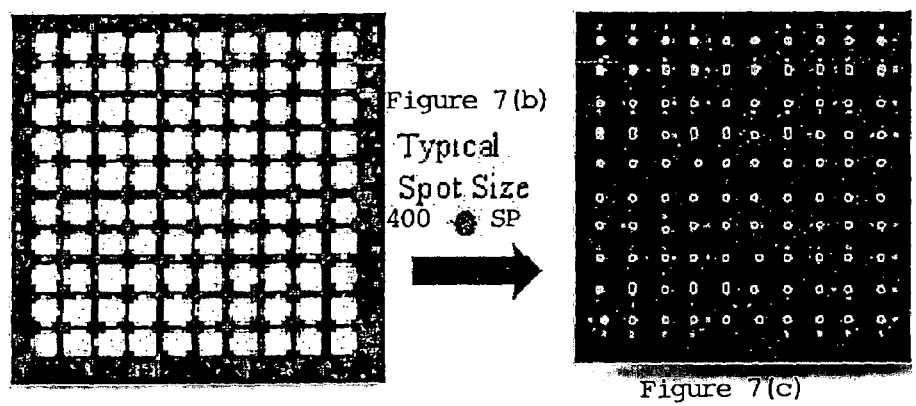
FIG. 7 illustrates one sub-grid matching by typical spot with a diameter SP.

FIG. 7(a) shows one sub-grid image 309 after the threshold operation. FIG. 7(b) is image 400 showing a typical spot size with a diameter of SP. FIG. 7(c) is one sub-grid segmentation result of spot centres.

Figure 8:
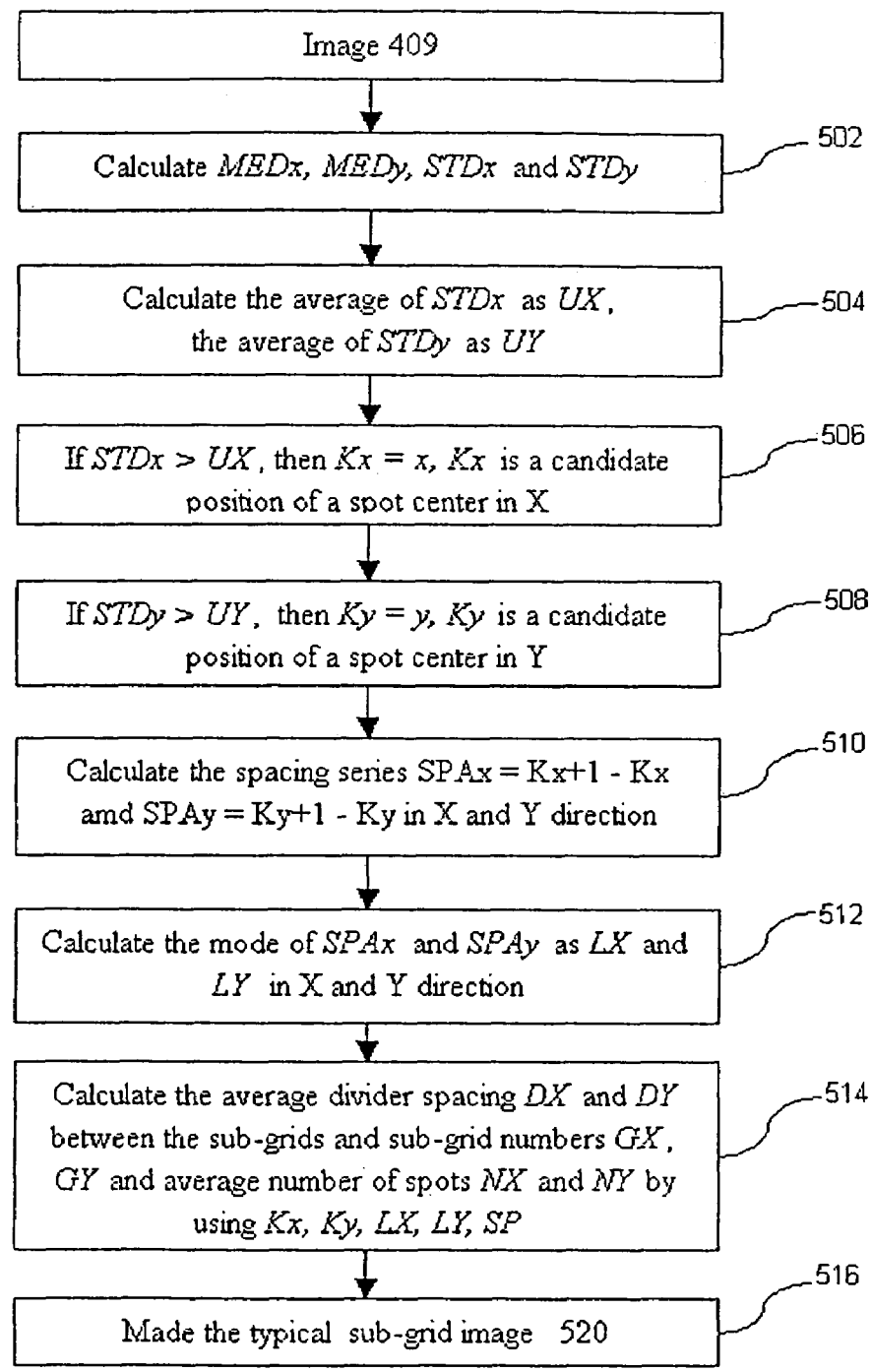
FIG. 8 illustrates the steps of an embodiment of statistical analysis of spot overlay pattern.

FIG. 8 is the description of spot overlay analysis procedure. This procedure uses the input image 409. At step 502, the mean and standard deviation of the image 409 are calculated in the X and Y direction using Eqs. 4 to 7:

$$MED_x = \frac{1}{n}\sum_{y=0}^{n} I_{x,y} \quad (4)$$

$$MED_y = \frac{1}{m}\sum_{x=0}^{m} I_{x,y} \quad (5)$$

$$STD_x = \sqrt{\frac{1}{n-1}\sum_{y=1}^{n}(I_{x,y}-MED_x)^2} \quad (6)$$

$$STD_y = \sqrt{\frac{1}{m-1}\sum_{x=1}^{m}(I_{x,y}-MED_y)^2} \quad (7)$$

where MEDx and MEDy are the mean values in the X and Y directions respectively, STDx and STDy are values of the standard deviation in the X and Y directions respectively, n is the height and m is the width of the image 409.

At step 504, the average values of STDx and STDy are calculated by:

$$UX = \frac{1}{m}\sum_{x=0}^{m} STD_x \quad (8)$$

$$UY = \frac{1}{n}\sum_{y=0}^{n} STD_y \quad (9)$$

where UX and UY are the average values of STDx and STDy respectively, m and n are the width and height of image 409.

At step 506, every STDx is compared with UX. If STDx is larger than UX, the position x is registered in an array Kx as a candidate of the spot centre position in the X direction. At step 508, similarly, every STDy is compared with UY, and the position y at which STDy is larger than UY is registered as a candidate of the spot centre position in the Y direction. At step 510, a spacing series in X or Y is obtained by calculation:

$$SPAx = K_{x+1} - K_x (x=0, 1, \ldots, km) \quad (10)$$

$$SPA_y = K_{y+1} - K_y (y=0, 1, \ldots, kn) \quad (11)$$

where SPAx and SPAy are the spacing between the candidate of spot centres in the X and Y directions, and km and kn are the numbers of candidates for the spot positions in X and Y directions respectively.

At step 512, the values of the modes of SPAX and SPAy are calculated by the following equations:

$$LX = \text{Mode}(SPA_x) \ (x=1, 2, \ldots, px) \quad (12)$$

$$LY = \text{Mode}(SPA_y) \ (y=1, 2, \ldots, py) \quad (13)$$

where LX or LY are the values of the mode of SPAx or SPAy respectively, km and kn are the numbers of candidates of the spot positions in the X and Y directions respectively, and px and py are the numbers of spacing values between the spot candidates in the X and Y directions respectively. At step 514, $K_x$, $K_y$, LX, LY, and SP are used to obtain the spacing SDx and SDy between sub-grids and their positions Px and Py, sub-grid numbers GX and GY, and average numbers of spots in every sub-grid NX and NY in the X and Y directions. Every sub-grid area can be decided by Px and Py. At step 516, a typical sub-grid image 520 is made according to LX, LY, NX, NY and SP.

Figure 9:
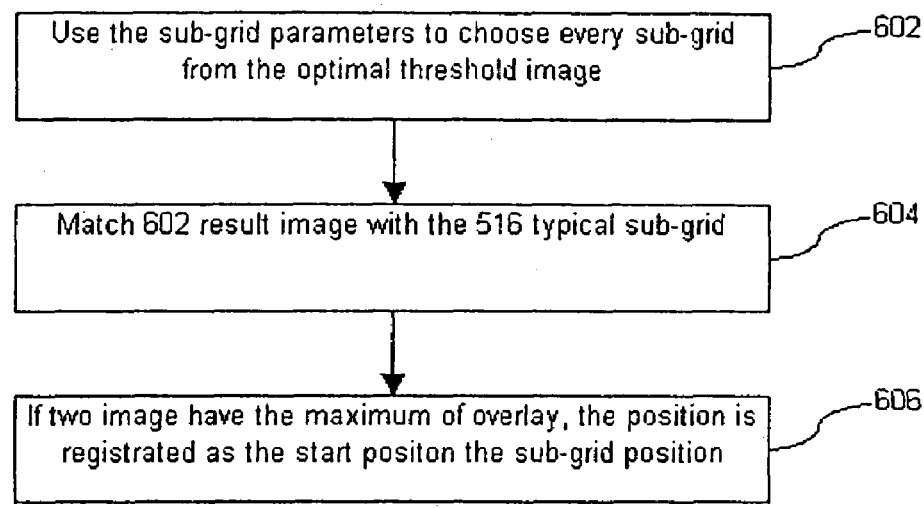
FIG. 9 illustrates the steps of an embodiment of sub-grid image matching with a typical sub-grid image.

FIG. 9 shows the flow chart of the sub-grid image matching procedure using a typical sub-grid image. At step 602, every sub-grid of image 118 is selected to make a buffer image 603 by using Px and Py. At step 604, every sub-grid image is matched to the typical sub-grid image 520. After the matching is finished, the position of the typical sub-grid at the correspondent position of image 118 is registered as one sub-grid of the overlay of the micro-array. The matching procedure is executed for all sub-grids and the whole overlay of micro-array is determined.

Figure 10:
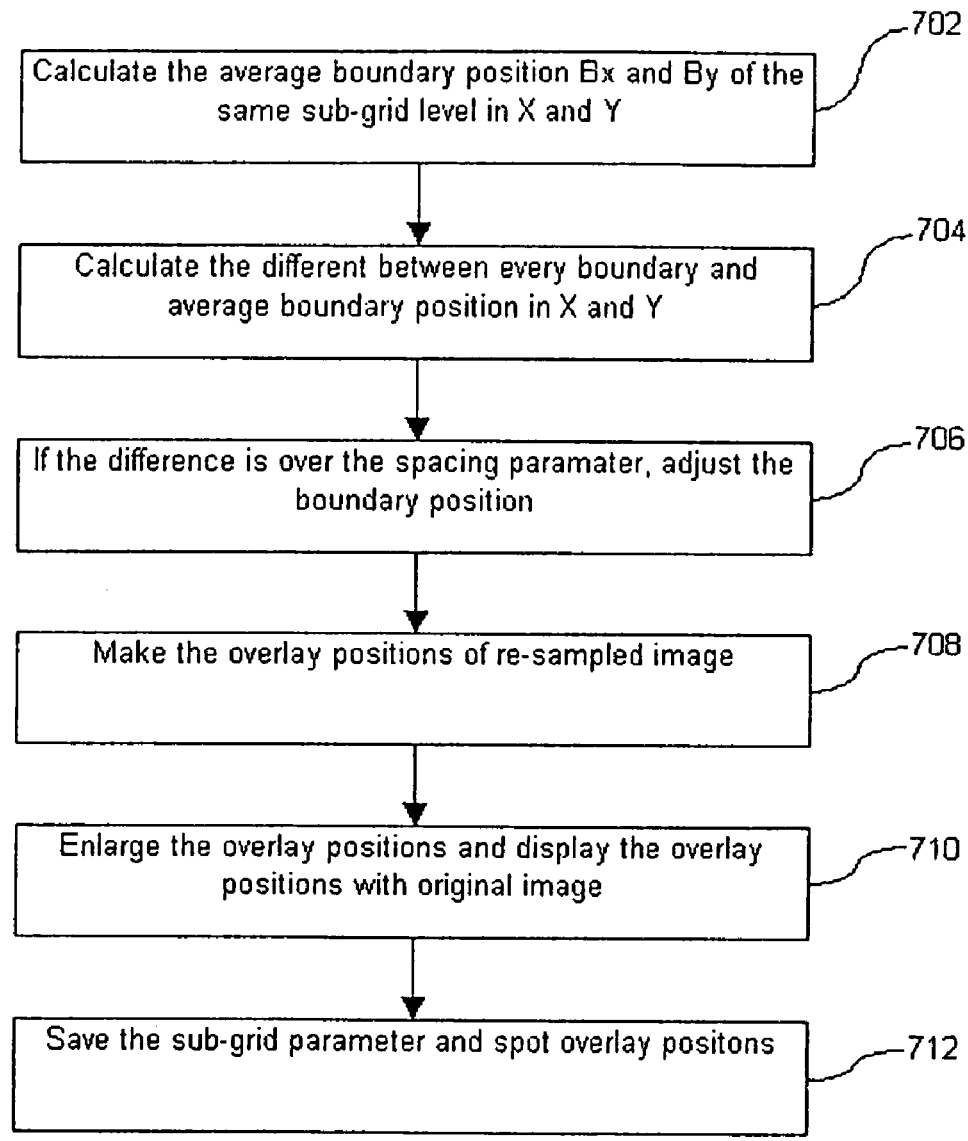
FIG. 10 illustrates the steps of an embodiment of precise adjustment of sub-grid boundary positions.

FIG. 10 is the flow chart of precise adjustment procedure of sub-grid boundary positions. In this procedure, the precise boundaries of the micro-array overlay is performed. At step 702, the average boundary positions ABx and ABy of the sub-grids at the same row or column are calculated. At step 704, the difference between sub-grid boundaries and ABx and Aby is compared. At step 706, if the difference at 704 is more than the spacing LX or LY, the boundary positions of the typical sub-grid at the correspondent position of image 115 is adjusted, and then the sub-grid of image 115 is matched again by the typical sub-grid image around the position of correspondent sub-grid. At step 708, an overlay of image 118 is made and all overlay sub-grids and spot centre positions are determined. At steps 710 and step 712, the image 115 with the overlay is displayed. The original scale from the precise matching result is used to make a final overlay image.

FIG. 11 shows the results of using the automated spot segmentation algorithm when a high quality micro-array image is used. FIG. 11(a) is the original high quality Cy5 micro-array image showing sixteen sub-grids. FIG. 11(b) is the result of carrying out a spot position identification using the fully-automated spot segmentation technique of the present invention. Note that all of the spots in the sixteen sub-grids have been identified. It can be seen that FIG. 11(b) is a much clearer image than the image shown in FIG. 11(a).

FIG. 12 shows the results of using the automated spot segmentation algorithm when a low quality micro-array image is used. FIG. 12(a) is the original low quality Cy3 micro-array image showing twenty-four sub-grids and various imperfections such as dust and incomplete spot deposition. FIG. 12(b) shows the result of a spot position identification using the fully-automated spot segmentation technique of the present invention. Note that all of the spots in the twenty-four sub-grids in FIG. 12(b) have been identified and that FIG. 12(b) is much clearer than FIG. 12(a).

Numerous variations will be readily apparent to those skilled in the art within the scope of the attached claims.

We claim:

1. A method of automatically processing images from a micro-array using an image processor, said method comprising pre-processing said images to ensure that said images meet a predetermined threshold, inputting images that meet said threshold to said image processor, said processor automatically calculating a size of a spot image, automatically calculating a spacing between adjacent spot images matching a particular spot image with an average spot size, automatically generating a first grid, automatically adjusting said first grid to fit said spot images being processed, analyzing a precise sub-grid position and calculating final overlay positions and reporting an output.

2. A method of automatically processing images from a micro-array using an image processor, said method comprising pre-processing said images to ensure that said images meet a predetermined threshold, inputting images that meet said threshold to said image processor, said processor automatically calculating a size of a spot image, automatically calculating a spacing between adjacent spot images, automatically generating a first grid, automatically adjusting said first grid to fit said spot images being processed, checking an image background and comparing an intensity of said background to an intensity of a spot image and inverting said spot images with said background where said background is brighter than the intensity of said spot image and reporting an output.

3. A method of automatically processing images as claimed in claim 2 where said spot images are inverted, said method including the step of setting a brightness of said spot images to zero.

4. A method of automatically processing images from a micro-array using an image processor, said method comprising pre-processing said images to ensure that said images meet a predetermined threshold, inputting images that meet said threshold to said image processor, said processor automatically calculating a size of a spot image, automatically calculating a spacing between adjacent spot images, automatically generating a first grid, automatically adjusting said first grid to fit said spot images being processed, checking an optimal threshold, performing an image histogram extension, performing an optimal threshold and obtaining a threshold image and reporting an output.

5. A method of automatically processing images from a micro-array using an image processor, said method comprising pre-processing said images to ensure that said images meet a predetermined threshold, inputting images that meet said threshold to said image processor, said processor automatically calculating a size of a spot image, automatically calculating a spacing between adjacent spot images, automatically generating a first grid, automatically adjusting said first grid to fit said spot images being processed, calculating a pattern spectrum and performing a morphology opening operation by using a typical selected element image size minus two and performing a morphology opening operation by using a typically selected element size of plus two and subtracting the results to obtain a spot candidate image and reporting an output.

6. A method of automatically processing images from a micro-array using an image processor, said method comprising pre-processing said images to ensure that said images meet a predetermined threshold, inputting images that meet said threshold to said image processor, said processor automatically calculating a size of a spot image, automatically calculating a spacing between adjacent spot images, automatically generating a first grid, automatically adjusting said first grid to fit said spot images being processed, calculating a circle area using a typical spot size, using a counter to accumulate the number of pixels within said circle area, registering a center position if the number of pixels is equal to the number of pixels for a typical spot size and using the typical spot size and registered center position to make a spot candidate image and reporting an output.

7. A method for automatically processing images as claimed in claim 6 including the step of calculating the mean and standard deviation of an image in the X and Y directions, calculating the average value of the mean and standard deviation of said image, comparing the mean and standard deviation with the average values in the X direction and in the Y direction, registering a spot center position in the X direction if the mean and standard image in the X direction is larger than the average value in said X direction and registering a spot center position in the Y direction for said image if the mean and standard deviation in the Y direction is larger than the average value in the Y direction.

8. A method for automatically processing images as claimed in claim 7 where there are sub-grids and sub-grid numbers, said method including the steps of calculating an average divider spacing between said sub-grids and sub-grid numbers and an average number of spots.

9. A method as claimed in claim 8 including the step of using sub-grid parameters to choose every sub-grid from an optimal threshold image.

10. A method for automatically processing images as claimed in claim 6 including the steps of conducting a spot overlay analysis procedure, calculating the value of modes of the main and standard deviation in the X and Y directions.

11. A method for automatically processing images as claimed in claim 10 including the step of making a typical sub-grid image.

12. A method as claimed in claim 11 including the steps of matching an image with a typical sub-grid image and registering a position as a start position for the sub-grid if the resultant image and the typical sub-grid image have a maximum overlay.

13. A method of automatically processing images as claimed in claim 12 including the steps of adjusting the boundary position if the difference between the boundary position and the average boundary position in the X and Y directions is greater than a spacing parameter and making overlay positions of a re-sampled image.

14. A method of automatically processing images from a micro-array using an image processor, said method comprising pre-processing said images to ensure that said images meet a predetermined threshold, inputting images that meet said threshold to said image processor, said processor automatically calculating a size of a spot image, automatically calculating a spacing between adjacent spot images, automatically generating a first grid, automatically adjusting said first grid to fit said spot images being processed, there being sub-grids and calculating an average boundary position of each sub-grid in the X and Y directions and calculating the difference between each boundary and an average boundary position in the X and Y directions and reporting an output.

15. A method of automatically processing images as claimed in claim 14 including the steps of enlarging overlay positions, displaying overlay positions with an original image and saving the sub-grid parameter and spot overlay position.

* * * * *